Patented Nov. 1, 1932

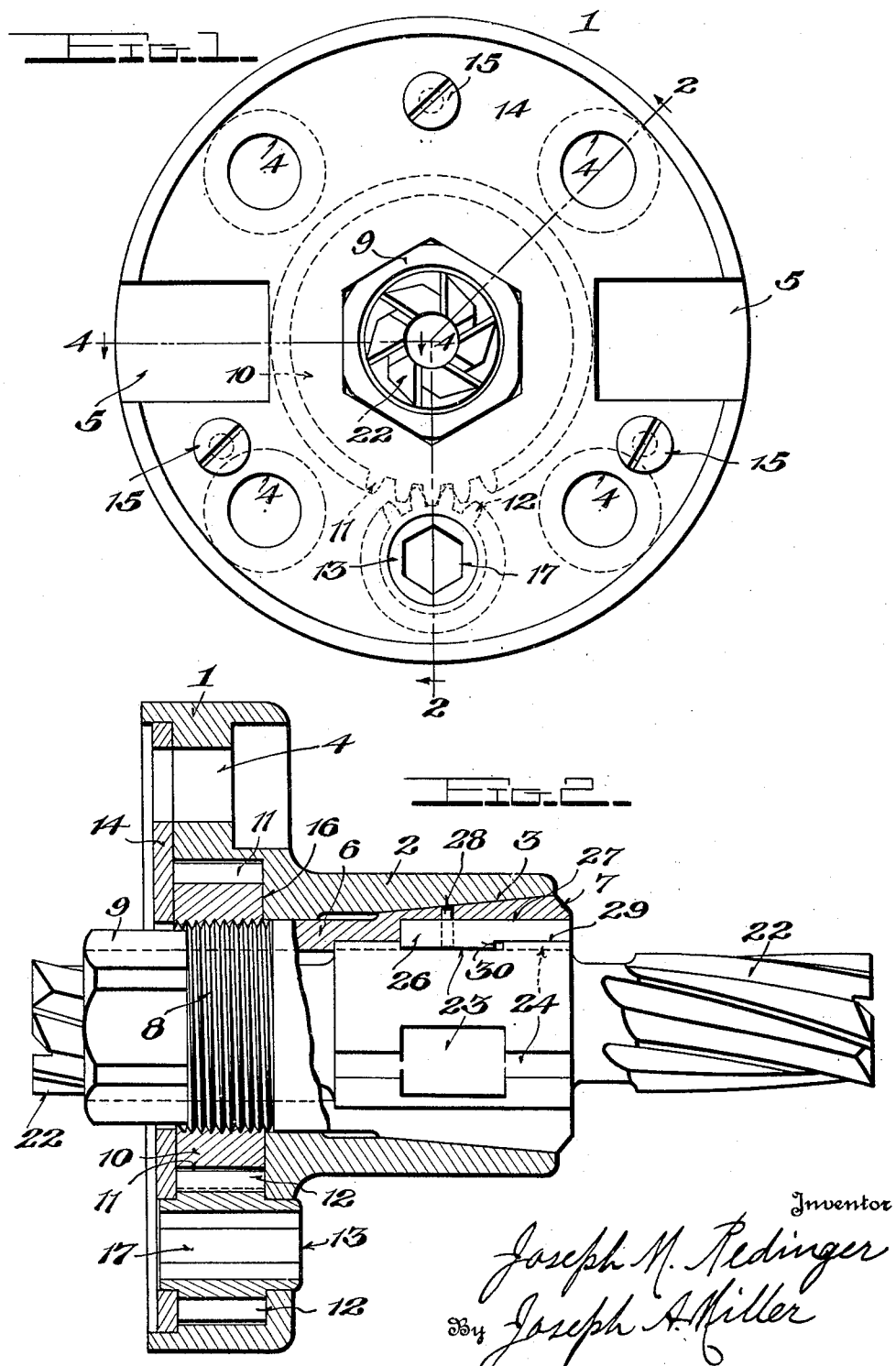

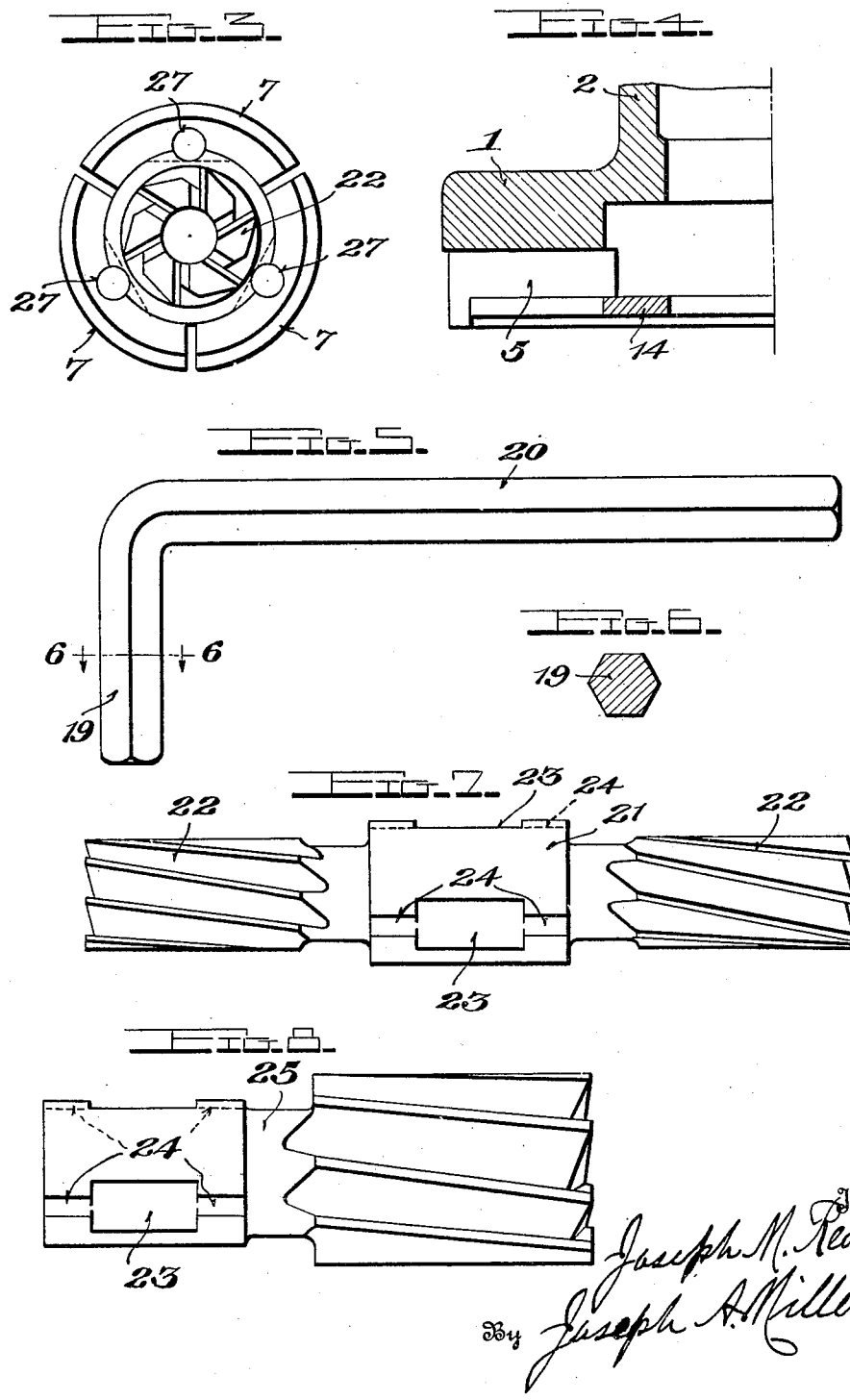

1,886,224

UNITED STATES PATENT OFFICE

JOSEPH M. REDINGER, OF JOHNSTON, RHODE ISLAND

CONE CHUCK

Application filed December 5, 1931. Serial No. 579,157.

The invention relates to certain useful improvements in cone chucks and the primary object thereof is to provide improved means for easily and quickly gripping and releasing the tool.

The invention further aims to provide means of this character which is simple, economical and of compact construction, reliable in operation and capable of easy and ready manipulation in gripping and releasing the tool:

A further object of the invention is to provide improved means for holding the tool against axial movement in the chuck independent of the gripping action per se of the latter.

The invention has still further and other objects which will be later set forth and manifested in the course of the following description.

In the drawings:—

Figure 1 is a front elevation of the invention;

Figure 2 is a section on line 2—2 of Figure 1;

Figure 3 is a rear end elevation of the cone jaws with a tool held therebetween;

Figure 4 is a section on the line 4—4 of Figure 1;

Figure 5 is a plan view of the wrench employed in manipulating the jaws;

Figure 6 is a section on line 6—6 of Figure 5;

Figure 7 is a top plan view of a double end milling tool for use with the present invention, and Figure 8 is a view similar to Figure 7 of a single end milling tool.

In proceeding in accordance with the present invention a chuck body is employed which is composed of a circular head 1 having a hub 2 projecting rearwardly therefrom, the hub having an internal tapered bore 3. The head 1 is formed with a series of countersunk openings 4 to receive bolts whereby to secure the chuck to the rotative disk or spindle of a milling machine. The head is further formed with cutout portions or sockets 5 to receive lugs, (not shown) which are carried by the disk of a standard milling machine spindle, these elements forming no part of the present invention. The present invention particularly resides in the tubular or sleeve like member 6 which latter is formed with a series of spaced cone jaws 7, there preferably being three of such jaws as shown in Figure 3 of the drawings. These jaws engage against the cone shaped or tapered bore 3 of the hub 2 of the body as shown in Figure 2. The member 6 is externally threaded as shown at 8 adjacent its head portion 9, the threads being engaged with a ring gear 10 having teeth 11 on its periphery, the latter being in mesh with the teeth 12 of a pinion 13. A plate 14 is secured by screws 15 to the head 1 of the chuck body and engages the gear 10 so as to hold the latter against axial movement while still permitting free rotation thereof. The gear 10 it will be seen is disposed in a cut-out 16 provided therefor in the head 1 which latter and the plate 14 are formed with registering openings to receive the ends of the pinion 13 therein and to provide a bearing therefor. The pinion 13 is formed with a preferably hexagonal opening 17 to receive the end 19 of a wrench 20 therein, so that upon insertion of the end 19 of the wrench 20 in the open center of the pinion 13 the latter can be freely turned thereby in turn to rotate the gear 10 and through the latter effect axial movement of the tubular member 6, thereby to cause the cone jaws 7 to engage the cone bearing 3 of the hub 2. It will be seen that upon movement of the jaws 7 to the left of Figure 2 same will grip the tool and upon movement thereof to the right the tool will be released.

In Figure 7 a double end milling tool, shown, is composed of a body having a central portion 21 and the usual cutters 22 at its ends.

The body 21 has a series of flat faces 23 and grooves 24 which extend outwardly from the ends of the flat faces 23 at points central of the width of such flat faces, which construction is also common to the single end milling tool 25 shown in Figure 8, and all of which is shown in my Patent #1,702,132 of Feb. 12, 1929. In the present invention however, I employ keys 26 which are pinned in grooves 27 provided therefor in the jaws 7 by means of pins 28. The keys are cut away at 29 so as to form end shoulders 30 which together with the inner ends of the keys engage the end walls resultant from the flat faces 23 upon turning of the cutter to dispose said walls opposite to the end walls aforesaid resultant from the flat faces 23. The operation as to this feature is identical with that set forth in my aforementioned patent, and briefly resides in inserting cutter in the jaws 7 with the keys 26 in register with the grooves 24, and upon registry of the main body of the key with the flat faces 23 the cutter is slightly turned to bring the inner ends of the keys and the walls 30 opposite the end walls resultant from the slots 23, thereby holding the tool against movement axially of the chuck.

Referring to Figs. 1 and 2 it will be seen that the head 9 of the member 6 is of hexagonal or may be of other non-circular form, and that same projects through an opening of corresponding shape provided therefor in the plate 14, consequently the member 6 while permitted axial or sliding movement, is held against rotation. The plate thus functions in a dual capacity.

Having thus described my invention what I claim as new and desire to secure by Letters Patent is:—

1. In a chuck, a body having a head and a hub formed with a conical bore, a tubular member in the bore having a head of non-circular form and having exterior threads and cone-shaped jaws for engagement with the conical bore, a ring gear in the head of the body having a threaded bore engaged with the threads of the tubular member, a pinion in the head of the body in mesh with the ring gear and having a wrench receiving bore, and a plate secured to the head of the body to hold the gear therein and to provide a bearing for one end of the pinion, said plate having an opening conforming in shape to that of the head of the member so as to hold the member against rotation while permitting sliding thereof.

2. In a chuck, a body having a head and a hub formed with a conical bore, a tubular member in the bore having a part of non-circular form and having exterior threads and cone-shaped jaws for engagement with the conical bore, a ring gear in the head having a threaded bore engaged with the threads of the tubular member, a pinion in the head in mesh with the ring gear, wrench engaging means carried by the pinion, and combined means connected to the body for holding the pinion in the head and having an opening of a shape corresponding to said part of the member for holding the member against rotation while allowing same to have axial movement.

3. In a chuck, a body having a head and a hub formed with a conical bore, a tubular member in the bore having a part of non-circular form and having exterior threads and cone-shaped jaws for engagement with the conical bore, a ring gear in the head having a threaded bore engaged with the threads of the tubular member, a pinion in the head in mesh with the ring gear, means to rotate the pinion, and means carried by the head and having an opening of a shape corresponding to that of said part of the member to hold the latter against rotation while still permitting axial movement thereof.

4. In a chuck, a body, axially movable tool gripping means in the body having a part of non-circular form, means to cause said gripping means to grip a tool when moved in one direction and to release the tool when moved in an opposite direction, a ring gear threaded over the gripping means to move same, a pinion in mesh with the ring gear, means carried by the body and having an opening conforming to and receiving said part of the gripping means for holding the latter against rotation while permitting axial movement thereof, and means to actuate the pinion.

5. In a chuck, a body, axially movable tool gripping means in the body having a part of non-circular form, means to cause said gripping means to grip a tool when moved in one direction and to release the tool when moved in an opposite direction, a gear, means to effect movement of the gripping means upon rotation of the gear a pinion in mesh with the gear, means carried by the body and having an opening conforming to and receiving said part of the gripping means for holding the latter against rotation while permitting axial movement thereof and means to actuate the pinion.

6. In a chuck, a body, movable tool gripping means in the body having a part of non-circular form, means to cause said gripping means to grip a tool upon movement thereof, a gear, means to effect movement of the gripping means by the gear, a pinion in mesh with the gear, means carried by the body and having an opening conforming to and receiving said part of the gripping means for holding the latter against rotation while permitting axial movement thereof and means to actuate the pinion.

7. A chuck having tool gripping jaws formed with axial grooves, keys secured in the grooves and having reduced outer ends forming shoulders, means spaced from the shoulders for securing the keys against movement and a tool having flattened portions and grooves to receive the keys extending outwardly from the ends of the flattened portions at points between the sides of the latter whereby upon insertion of the keys in the tool grooves and subsequent turning of the tool the inner end of the key and said shoulder will lie opposite the end walls resultant from the flattened portions and thereby prevent axial movement of the tool.

8. In a chuck, a body, axially movable tool gripping means in the body having a part of non-circular cross-section, means within the body for effecting axial movement of said gripping means, and combined means for holding the gripping means against rotation while permitting said axial movement thereof and for removably holding the operating means of the gripping means in operative position within the body.

9. In a chuck, a body having an opening in its front, axially movable tool gripping means in the body having a part of non-circular cross section, means in the body, removable through said opening thereof, for effecting axial movement of said gripping means, and a plate-like member removably attached to the body and disposed over said opening thereof to removably hold said operating means of the gripping means in the body and having an opening substantially corresponding in shape to that of the non-circular part of the gripping means to hold the latter against rotation while permitting said axial movement thereof.

In testimony whereof I have signed my name to this specification.

JOSEPH M. REDINGER.